United States Patent [19]

Santini

[11] Patent Number: 5,276,075

[45] Date of Patent: Jan. 4, 1994

[54] WASHABLE ACRYLIC PAINT

[75] Inventor: Andree F. Santini, Easton, Pa.

[73] Assignee: Binney & Smith Inc., Easton, Pa.

[21] Appl. No.: 784,893

[22] Filed: Oct. 30, 1991

[51] Int. Cl.$^5$ .................................................. C08L 1/14
[52] U.S. Cl. .................................... 524/40; 524/444; 524/523; 524/558; 524/560
[58] Field of Search ................ 524/40, 523, 558, 560, 524/444

[56] References Cited

U.S. PATENT DOCUMENTS

| | | | |
|---|---|---|---|
| Re. 31,936 | 7/1985 | Sperry et al. | 524/522 |
| 2,506,892 | 5/1950 | Radley | 117/161 |
| 3,111,497 | 11/1963 | Haas | 260/29.6 |
| 3,249,463 | 5/1966 | Carlée | 117/76 |
| 3,692,731 | 9/1972 | McAdow | 260/32.8 R |
| 3,697,070 | 10/1972 | McAdow | 106/291 |
| 3,755,238 | 8/1973 | Wiita | 260/296 XA |
| 3,779,970 | 12/1973 | Evani et al. | 260/29.6 RW |
| 3,839,253 | 10/1974 | Kershaw et al. | 260/29.6 R |
| 3,922,244 | 11/1975 | Stephens et al. | 260/29.7 UA |
| 3,983,060 | 9/1976 | Dill | 260/29.6 RW |
| 3,998,768 | 12/1976 | Pettit, Jr. | 260/17 R |
| 4,048,136 | 9/1977 | Kobayashi et al. | 260/42.14 |
| 4,087,397 | 5/1978 | Martorano et al. | 260/29.6 WB |
| 4,104,219 | 8/1978 | Peters et al. | 260/29.6 RB |
| 4,120,835 | 10/1978 | Goodell | 524/40 |
| 4,143,019 | 3/1979 | Burley | 260/29.6 RW |
| 4,226,754 | 10/1980 | Yun et al. | 260/29.6 TA |
| 4,290,932 | 9/1981 | Wright et al. | 260/29.6 WB |
| 4,339,365 | 7/1982 | Becher et al. | 523/400 |
| 4,377,661 | 3/1983 | Wright et al. | 524/522 |
| 4,397,984 | 8/1983 | Wendel et al. | 524/814 |
| 4,402,262 | 9/1983 | Handforth | 101/129 |
| 4,410,655 | 10/1983 | Funakoshi et al. | 524/522 |
| 4,417,016 | 11/1983 | Cline et al. | 524/156 |
| 4,663,384 | 5/1987 | Penzel et al. | 524/519 |
| 4,683,260 | 7/1987 | Wickert | 524/512 |
| 4,687,789 | 8/1987 | Gonnet et al. | 523/122 |
| 4,782,109 | 11/1988 | DuLaney et al. | 524/501 |
| 4,840,669 | 6/1989 | Hughes et al. | 106/19 |
| 4,840,670 | 6/1989 | Hughes et al. | 106/19 |
| 4,871,797 | 10/1989 | Buter | 524/505 |
| 4,902,590 | 2/1990 | Adamson | 429/94 |

OTHER PUBLICATIONS

16 Encyclopedia of Chemical Technology, *Paint*, pp. 742–761 (Kirk-Othmer 3d Ed.).

1 Encyclopedia of Chemical Technology, *Acrylic Ester Polymers*, p. 388 (Kirk-Othmer 3d Ed.).

*Primary Examiner*—Paul R. Michl
*Assistant Examiner*—LaVonda DeWitt
*Attorney, Agent, or Firm*—Leydig, Voit & Mayer, Ltd.

[57] ABSTRACT

An aqueous emulsion of an acrylic polymer having a glass transition temperature between 0° C. and 20° C., glitter, and an associative thickener which does not destabilize the glitter comprising a hydrophobically-modified cellulosic polymer, wherein after the composition is applied onto a substrate and cured, it remains dimensionally stable, flexible, and exhibits a gloss of at least 50 after at least one washing.

9 Claims, No Drawings

WASHABLE ACRYLIC PAINT

BACKGROUND OF THE INVENTION

1. Field Of The Invention

This invention relates generally to the field of paints. In particular, this invention relates to acrylic paints that can be applied to a fabric in a dimensional line or brushed out flat. Such paints can further withstand repeated laundering and folding without cracking.

2. Brief Description Of The Prior Art

Hand painted clothing and fabrics have become increasingly popular among consumers over the past several years. This popularity has spurred the development of craft kits that are designed to allow the consumer to make his or her own hand painted clothing or fabrics. However, it has proven difficult to provide a paint composition that, when applied to fabric, possesses desirable aesthetic properties while also being capable of withstanding repeated laundering without losing such properties.

One of these desirable aesthetic properties sought after by consumers in such paints is a high degree of gloss. In addition, the paint should have sufficient flexibility so that cracking does not occur as the fabric moves during laundering or wear. Paints which allow the creation of three-dimensional lines on a fabric, and which will hold this configuration after drying, are also highly desirable. Another desirable property is the ability of a paint to provide a "glitter" effect when exposed to light. Further, it is advantageous that any such paint be relatively non-toxic and economical to produce.

OBJECTS OF THE INVENTION

It is, therefore, an object of the invention to provide a paint having the aforementioned characteristics.

Specifically, it is an object of the present invention to provide a paint which, after drying, has a high degree of gloss and further, when applied to fabrics such as cotton or cotton polyester blends, is capable of maintaining this high degree of gloss after repeated laundering.

An additional object of the present invention is to provide a paint which is able to hold a dimensional line even after drying or, if desired, can be brushed out flat.

Yet another object of the present invention is to provide a paint that is able to produce a glitter effect when exposed to light.

It is a further object of the present invention to provide an economical, non-toxic paint for use on clothing or other fabrics.

SUMMARY OF THE INVENTION

The foregoing and other objects of the present invention are achieved by a washable acrylic paint composition comprising water, a film-forming acrylic polymer having a glass transition temperature between about 0° C. and 20° C., and a thickener, the composition, when applied to a substrate, being capable of forming a flexible film that exhibits a gloss of at least 50.

Where it is desired to impart a degree of glitter to the resulting film, a composition is provided by the present invention which comprises an aqueous emulsion of an acrylic polymer having a glass transition temperature between 0° C. and 20° C., glitter, and an associative thickener which does not destabilize the glitter comprising a hydrophobically-modified cellulosic polymer, wherein after the composition is applied onto a substrate and cured, it remains dimensionally stable, flexible, and exhibits a gloss of at least 50 after at least one washing.

DETAILED DESCRIPTION OF THE INVENTION

While the invention will be discussed in connection with certain preferred embodiments, it is not intended to be so limited. On the contrary, the invention is intended to cover all alternatives, modifications, and equivalents as may be included within the spirit and scope of the invention as defined by the appended claims.

The present invention provides a washable acrylic paint composition comprising water, a film-forming acrylic polymer having a glass transition temperature between about 0° C. and 20° C., and a thickener, the composition, when applied to a substrate, being capable of forming a flexible film that exhibits a gloss of at least 50.

Referring initially to the acrylic polymer component, one of the aforementioned characteristics of this component is its glass transition temperature (Tg). This temperature is defined as the temperature at which the acrylic polymer changes from a brittle solid to a plastic condition. In other words, an acrylic polymer will change from a brittle solid to a plastic condition when it reaches temperatures above the glass transition temperature. As a general rule, such binders which possess relatively high glass transition temperatures will provide a greater degree of gloss to a paint composition. However, this is negatived, for purposes of the present invention, by a decrease in the flexibility of the film, which leads to cracking of the film when flexed, e.g., during laundering.

In addition to the glass transition temperature, the particle size of the acrylic polymers also affect the gloss of the film. Generally, the larger the resin particle, the lower the gloss of the resulting film.

Although various acrylic polymers may be used in the compositions of the present invention, such polymers, when used in combination with the other components of these compositions, should be able to provide the resulting film with the desired gloss, which is advantageously at least about 50 and preferably at least 70 (when measured at 60°), and washability (e.g., flexibility and permanence) characteristics. In many commercial formulations, such polymers are typically provided in the form of either an aqueous suspension, dispersion, or emulsion. In such cases, an appropriate amount of dispersant and/or emulsifier is added to the aqueous acrylic polymer combination. Examples of such commercially available aqueous acrylic polymer emulsions that may be advantageously used in the compositions of the present invention include those manufactured by Rohm & Haas Company and sold under the name RHOPLEX ® AC-234 and AC-235. RHOPLEX ® AC-234 is a medium gloss alkali swellable non-ionic aqueous acrylic copolymer having a glass transition temperature of about 6° C. and a pH of from about 9.5 to about 10.0. RHOPLEX ® AC-235 is similar to RHOPLEX ® AC-234, but has a slightly higher glass transition temperature of about 13° C. Both are stated by the manufacturer to comprise emulsions which contain about 47 wt. % acrylic resin solids, about 53 wt. % water, and an undisclosed amount of an emulsifier.

Advantageously, from about 20% to about 45% by weight of the composition of the previously described acrylic polymers is included on the composition, and preferably from about 30 wt. % to about 40 wt. %. Also preferred is a glass transition temperature range of about 6° C. to about 13° C. as regarding the acrylic polymers.

The acrylic polymers included in the composition of the present invention also have the advantage of providing a flexible film that remains flexible when subjected to laundering without requiring the inclusion of a plasticizer. When relatively "hard" acrylic polymers (those having glass transition temperatures that are relatively low) are used, plasticizers are required to provide the requisite flexibility in the resulting film. However, the plasticizers leach out of the film relatively quickly, lending to premature cracking of the film. The present composition, which advantageously does not include such plasticizers overcomes these limitations.

The present composition further comprises a thickener. Although any amount of thickener can be added to the inventive composition, the advantageous amount of thickener will be determined by the properties desired in both the application as well as the post-application properties of the composition. For example, sufficient thickener is advantageously added to enable the composition to hold a dimensional line both after application onto a substrate and during the drying time of the composition. In this way, the resulting fully dried composition will possess a three-dimensional configuration. Conversely, the amount of thickener in the composition is advantageously limited such that, if desired, the composition can be brushed onto a substrate. Accordingly, the composition preferably possesses a viscosity of from about 60,000 cps to about 110,000 cps. For purposes of the present disclosure, all viscosities will be provided as measured on a Brookfield viscometer. Most preferably, the viscosity of the composition will range between about 90,000 cps and about 110,000 cps.

In addition to the foregoing, the thickeners used in the present invention should advantageously possess the ability to provide the required high viscosity build-up without discoloring the resulting film, should not adversely affect the washability of the film, or cause unwanted gelling of the composition.

Although any thickener can be used in the present compositions, acrylic polymers or copolymers are advantageously utilized therein. Preferably, such acrylic polymers or copolymers will possess one or more acid functionalities that can be neutralized or esterified in the presence of a base. Such neutralization or esterification is preferably completed prior to the thickener's addition to the paint composition in order to minimize the "shock" experienced by the composition.

ACRYSOL TT-615 and ACRYSOL ASE-60, which are acrylic copolymer emulsions available from Rohm & Haas, are examples of the previously described preferred thickeners. The ASE-60 thickener may be described as an acrylic polymer which contains carboxyl acid groups that are designed to either dissolve or swell when revitalized with a base. Such dissolution or swelling brings the composition to the desired viscosity. Complete neutralization is typically experienced at about pH 8.0. The TT-615 thickener is an alkali-swellable acrylic polymer emulsion wherein the polymer contains an acid functionality which, upon neutralization to a pH of from 7 to 10, provides for thickening of a composition into which it is incorporated. This second thickener is especially useful in compositions having a high electrolyte content.

The aforesaid compositions, while advantageously colorless or clear (as determined in the absence of coloring agents such as pigments or dyes in the compositions), may nevertheless be successfully used as an adhesive to permanently affix decorative beads, buttons, strings, sequins and the like to clothes and fabrics. However, the aforedescribed composition can be readily modified to provide a colored composition and/or one that glitters when exposed to light.

Turning initially to the colored compositions, a pigment, dye or mixture thereof may be added to the composition to provide color thereto. Pigments, which are most commonly used, are generally comprised of finely divided insoluble powders which impart color to a paint. Those pigments suitable for use in the compositions of the present invention include inorganic and organic pigments which are capable of providing fluorescent, pearlescent, and phosphorescent or glow-in-the-dark color to the compositions.

To achieve good coloring of the composition and promote compatibility with the remaining components, the pigments are best utilized in the form of an aqueous dispersion. A pigment dispersion may be prepared specifically for use in the present invention using the dry pigments as a starting point. However, from the standpoint of convenience, a commercial pigment dispersion is preferred. Commercially available pigment dispersions are typically combinations of a pigment, an aqueous based carrier, and a surfactant or dispersant system. These commercially available dispersions may also contain pigment extenders. Suitable dispersions that are commercially available include Blue BFD 1121 and PM Green GFD-1151 sold by Sun Chemical under the Flexiverse mark as well Yellow FGL and Colanyl Green GG-30 sold by Hoechst Celanese Corporation. Suitable fluorescent pigments include those available from Radiant Color Division, Magruder Color Company Inc., of Richmond, Calif. Phosphorescent pigments that may be used with the present composition include those available from United Mineral & Chemical Corporation of Lundhurst, N.J. such as Phosphorescent Pigment 100A.

In general, a workable pigment dispersion may have a larger or smaller particle size, depending upon the use to which the paint will be put. The lower limit on pigment particle size is determined not only by these functional characteristics of the paint composition, but also by the ability to form a stable dispersion.

The most suitable pigment particle size for the present invention will further vary depending upon the desired degree of gloss. As smaller particles provide a higher degree of gloss, such particulate size, advantageously less than about $3\mu$, and preferably less than about $1\mu$, should be used.

With regard to the pigment concentration, the minimum concentration of pigment which will produce a workable paint is governed primarily by the opacity and color intensity desired. The maximum workable concentration of pigment is determined largely by the ability of the composition to remain stable, and can vary widely depending upon the concentration of the other components. A practical upper limit in the formulation of a paint is about 40% by weight, since at higher pigment concentrations the aforesaid instability and undesirably high viscosity are often noticed. A concentration of from 1 to 30 wt. %, and preferably from 1 to about 5% by weight pigment in the composition, is ordinarily required to ensure good opacity and color intensity in a typical paint.

When custom made pigment dispersions are used instead of commercially available dispersions or suspensions, surfactants or dispersants, in addition to those that may be present in the preferred acrylic polymer dispersions or emulsions, may be added to the composition of the invention to promote suspension or dispersion stability of the pigment. A surfactant such as Triton ® X-405, a mixture of 70% octylphenoxypolyethoxyethano and 30% water available from Rohm & Haas, works well in the composition of the present invention when used in amounts (in addition to the amount of any dispersants or emulsifiers present due to the use of an aqueous acrylic polymer suspension, dispersion or emulsion) of up to about 5% by weight of the composition.

For the pigmented paints, particularly preferable is a composition having from about 30 wt. % to about 40 wt. % acrylic polymer, the polymer having a Tg ranging from about 6° C. to about 13° C. An example of a composition which provides such a preferred polymer is RHOPLEX ® AC-235 which, when combined with the other components of the present composition, provides optimum gloss, clarity (as determined in the absence of a pigment or other colorant) and flexibility to the resulting film. Alternatively, acrylic polymers can be blended to achieve the desired properties in the resulting film. For example, a composition comprising about 70 wt. % RHOPLEX ® AC-234 and about 5 wt. % Emulsion E-1630 (an aqueous acrylic emulsion containing about 45 wt. % polymer and 55 wt. % water, available from Rohm & Haas) was found to provide satisfactory performance characteristics.

Although individual thickeners worked well in the present invention, in the pigment formulations, a combination of two thickeners, ACRYSOL TT-615 and ACRYSOL ASE-60 (acrylic copolymer emulsions available from Rohm & Haas), present in a ratio of about 1:1 by weight, is preferably used. These thickeners comprise acrylic polymers containing acid groups that are capable of either dissolving or swelling in a basic composition. This combination of thickeners, in conjunction with the pigment and acrylic polymer, has been found to assist in the provision of optimum gloss, clarity (as determined in the absence of a pigment or other coloring agent), and washability to the final film.

Splashy colors, which are designed to be spritzed or splashed onto a substrate, can also be provided by use of the aforesaid composition. To prepare such splashy colors, less thickener is introduced into the composition such that the viscosity of the composition advantageously ranges from about 7,000 cps to about 14,000 cps.

As mentioned previously, glitter flakes may be added to the basic non-pigment composition discussed previously to impart a glitter effect. Glitter flakes typically comprise polyester coated, e.g., Mylar, flakes of aluminum which are dyed to a variety of colors. The mean flake particle size preferably is between 0.004 square inches and 0.008 square inches. This size limitation has an effect on the functioning of the resulting composition. A mean particle size of less than about 0.004 square inches tends to be less glitzy, while a mean particle size greater than about 0.008 square inches tends to rub off more easily when laundered. Commercially available glitter flakes, such as those manufactured by GLITTEREX Corporation of Belleview, N.J. and sold under the name POLY*FLAKE, have proven to be satisfactory.

Although the glitter flake itself is available in a variety of colors, conventional pigment or tint may be added to the composition to provide additional color.

The ratio of glitter flake to binder in the composition of the invention is generally not critical to the functioning of the composition or to achieving its benefits. However, a large amount of glitter, i.e., in excess of 15 wt%, is generally thought to be unnecessary as being unduly expensive.

To formulate these glitter paints, the same acrylic polymers and associated concentrations described previously can be used successfully. However, the preferred acrylic polymer is Rohm & Haas RHOPLEX ® AC-234 acrylic emulsion present at a concentration of from about 30 to 40 wt. % acrylic polymer as compared to the total inventive composition.

The glitter paints of the present invention further incorporate a thickener. While any thickener that provides the necessary viscosity build-up of the composition can be used, the thickener advantageously should not cause a destabilization of the composition, e.g., a decomposing of the aluminum in the glitter flakes, the leaching of color from the glitter, or a curling-up of the mylar on the glitter, gelling of the composition, or reducing the gloss of the resulting film from the desired range of at least 50 and, preferably at least 70. In addition, the acrylic polymer/thickener combination should further advantageously provide for the production of a film that is clear (as determined without the inclusion of glitter or other colorants). The preferred thickener for use in the present composition is NATROSOL ® PLUS, Grade 330, which is marketed by Aqualon Company of Wilmington, Del. This thickener possesses the desirable characteristics of cellulosic polymer thickeners, which build viscosity through hydrogen bonding with water molecules with the rheological performance of synthetic associative thickeners which act to thicken the composition by associating the hydrophobic groups. The thickener itself is a non-ionic water-soluble polymer which may be more particularly described as a hydrophobically modified hydroxyethylcellulose. The hydrophobic modification consists of long-chain alkyl groups that are chemically bound to the polymer. Advantageously, the thickener will be present in an amount such that the viscosity of the composition ranges from about 50,000 to 100,000 cps. Preferably, the viscosity ranges from about 70,000 cps to about 85,000 cps. Typically, these viscosity ranges can be attained by the use of from about 0.5 to 3 wt. % of the thickener.

Moreover, when such glitter flakes are incorporated into the composition, the pH of the composition should advantageously be above 7.0, and preferably from 7.0 to 8.5. To accomplish this, a pH regulant may be provided in an amount that is sufficient to maintain the pH of the composition within the aforesaid range. At a pH greater than 8.5, and if the glitter utilized comprises and aluminum flake having an overlayment of polyester film, this film can dissolve, exposing the aluminum flake to the remaining paint ingredients. Under these conditions, discoloration of the paint can occur. At a pH of less than 7.0, the acrylic resin is not soluble, resulting in the agglomeration of the acrylic polymer, detrimentally affecting the flow properties of the paint. Furthermore, at a pH of between 7 and 8.5 the functioning of the thickener component is optimized.

Any material which is compatible with the other components of the system and which maintains the pH within the desired range may serve as a pH regulant.

However, the volatility of the pH regulant affects the time required for the binder film to coalesce and for the paint to dry. Thus, the use of a pH regulant which does not have sufficient volatility can produce a paint which dries too slowly so that the formation of a continuous film is inhibited. The most preferred pH regulant for the glitter paints is hydrochloric acid. However, for some glitter paint colors, the preferred pH regulant is a potassium dihydrogenphosphate/sodium hydroxide buffer.

In one alternative formulation, known as fluorescent with interference flake the composition comprises both a pigment dispersion and interference flakes. Interference flakes are flakes of mylar colored with interference pigment. When such a combination is used, the color of the applied paint appears to "flip flop" when viewed from one angle versus a second angle. In this alternative formulation, the pigment dispersion is a fluorescent pigment contained in a dispersant.

Additional components may be added to any of the aforedescribed compositions depending on the specific use intended for the composition. These additional components may include defoamers, glass adhesion promoters, preservatives, and freeze/thaw protectors.

To enhance the manufacture of the compositions of the present invention, a defoamer may be used. One workable defoamer is Nalco 2305 Antifoam (a mixture of polyglycol, polysiloxane, polyglycol esters, a paraffinic solvent and water), manufactured by Nalco Chemical Company. This defoamer is found to work well in compositions of the invention when used in amounts of up to about 5 wt%.

In certain paint formulations, particularly in the glitter compositions, a glass adhesion promoter such as a silane may be added. In those formulations, the glass adhesion promoter is advantageously present in an amount of up to about 5% by weight. One commercially available glass adhesion promoter suitable for use in the present invention is sold by Union Carbide Corporation of Danbury, Conn. under the name of Silane A-187.

To maintain the shelf life of the compositions, one or more preservatives may be added. Preservatives serve as biocides and fungicides and may be added in any effective amount, though a typical concentration range is up to about 5 wt%. The use of preservatives in levels greater than about 5% by weight may cause the paint to become toxic or unstable and may, in any event, be unnecessary. Should alcohol be added to the composition as a drying agent, the alcohol also will function as a preservative to some extent.

Any conventional preservative may be utilized in the invention as long as there is compatibility with the remaining paint components. For example, preservatives manufactured by Troy Chemical and sold under the name Troysan® 174, (2[(hydroxymethyl)aminolethano]), and Troysan® Polyphase® AF-1 (a mixture of 3-iodo-2-propynyl butyl carbamate, xylene, cumene, trimethyl benzenes, dipropylene glycol and dimethyl sulfoxide), work well in compositions of the invention. A third suitable preservative is Nuosept 95, a bicyclic oxazolidines solution manufactured by HULS America Inc. of Piscataway, N.J.

To protect compositions of the invention when exposed to very low temperatures, a freeze/thaw protector may be used. One preferred freeze/thaw protector is propylene glycol, which is effective when used in amounts up to about 10% by weight, with the most preferred range being from about 1.5% to about 6.5% by weight.

As an example of the methodology that is typically utilized in the preparation of compositions of the present invention, the preparation of an acrylic glitter paint is provided in the following paragraph.

First, 23.0 lbs. of deionized water were added to a clean 50 gallon paint kettle. Dispersion (mixing) was begun at a slow speed. With the disperser running, the following were added: 2.3 lbs. defoamer (Nalco 2305), 340.0 lbs. acrylic resin (RHOPLEX® AC-234), 2.3 lbs. surfactant (Triton®X-405), 1.4 lbs. glass adhesion promoter (Silane A187), 2.1 lbs. preservatives (1.4 lbs. Nuosept 95 and 0.7 lbs. Polyphase® AF-1), and 11.0 lbs. pH regulant (1N Hydrochloric Acid). The mixing speed was then adjusted to 500 rpm for five minutes. 22.5 lbs. freeze/thaw protector (propylene glycol) and 3.8 lbs. thickener (NATROSOL® PLUS) were then premixed in a five gallon bucket until dispersed. The mixture was then added to the paint kettle while the kettle was stirred. The kettle was stirred at 500 rpm for five minutes. The mixing speed was increased to 1500 rpm and mixing continued for three minutes. The mixing speed was reduced to 500 rpm and mixing continued for fifteen minutes. After the dispersion was complete, 45.0 lbs. glitter (Royal Blue POLY*FLAKE) was added. A paddle was used to pull the glitter in from the sides of the kettle. Mixing was continued at 500 rpm for fifteen minutes.

By modifying the foregoing method of preparation, other paint formulations within the scope of this invention may be prepared. For example, for preparing a glossy, pigmented, non-glitter composition, pigment in the form of a dispersion is added to the 50 gallon paint kettle instead of the POLY*FLAKE. Examples of the composition of such a glossy paint, as well as other paints within the scope of the present invention, are provided below.

EXAMPLES

The following representative formulations are provided as examples of the composition of the invention. It will be apparent to those skilled in the art that many modifications, both of the materials and the method of preparation, may be practiced without departing from the purpose and intent of this disclosure.

| Component | Example 1 Glitter Paint wt % | Example 2 Glossy Paint wt % | Example 3 Glitter Paint wt % | Example 4 Glitter Paint wt % | Example 5 Glossy Paint wt % | Example 6 Splashy Paint wt % | Example 7 Glitter Paint wt % |
|---|---|---|---|---|---|---|---|
| Water | 9.05 | 7.43 | 5.07 | 5.35 | 10.74 | 12.35 | 6.92 |
| Acrylic Resin Emulsions: | | | | | | | |
| (Rohm & Haas AC-234) | 75.00 | — | 74.99 | 77.95 | — | — | 78.00 |
| (Rohm & Haas AC-235) | — | 80.00 | — | — | 78.04 | 79.87 | — |
| Pigment/Glitter | 6.40 | 4.02 | 9.93[1] | 6.35[1] | 4.82[2] | 2.47[2] | 6.40[1] |
| Dispersant (Tamol 731) | 0.50 | 0.50 | — | — | — | — | 0.50 |
| Thickeners: | | | | | | | |
| (Natrosol Plus) | 1.10 | — | 0.84 | 0.87 | — | — | 0.90 |

-continued

| | | | | | | | |
|---|---|---|---|---|---|---|---|
| (TT 615) | — | 1.10 | — | — | 1.06 | 0.45 | — |
| (ASE 60) | — | 1.10 | — | — | 1.06 | 0.45 | — |
| pH Regulant HCl | 2.00 | — | 2.43 | 2.45 | — | — | — |
| KH$_2$PO$_4$/NaOH buffer | — | — | — | — | — | — | 1.18 |
| Defoamer (Nalco 2305) | 0.25 | 0.25 | 0.51 | 0.51 | 0.13 | 0.14 | 0.40 |
| Surfactant (Triton X405) | 0.25 | 0.25 | 0.51 | 0.51 | — | — | 0.25 |
| Adhesion Promoter (Silane A-187) | — | — | 0.31 | 0.31 | — | — | — |
| Preservatives: | | | | | | | |
| (Polyphase AF-1) | 0.15 | 0.15 | 0.15 | 0.16 | 0.13 | 0.14 | 0.15 |
| (Nuosept 95) | 0.30 | — | 0.31 | 0.31 | — | — | 0.30 |
| (Troysan 174) | — | — | — | — | 0.19 | 0.20 | — |
| Freeze/Thaw Protector (Propylene glycol) | 5.00 | 5.00 | 4.96 | 5.23 | 3.84 | 3.93 | 5.00 |
| TOTAL | 100.00 | 100.00 | 100.00 | 100.00 | 100.00 | 100.00 | 100.00 |

| Component | Example 8 Glitter Paint wt % | Example 9 Glossy Paint wt % | Example 10 Glitter Paint wt % | Example 11 Glitter Paint wt % | Example 12 Glossy Paint wt % |
|---|---|---|---|---|---|
| Water | 10.37 | 10.71 | 10.34 | 10.84 | 3.40 |
| Acrylic Resin Emulsions: | | | | | |
| (Rohm & Haas AC-234) | — | — | — | — | — |
| (Rohm & Haas AC-235) | 75.39 | 77.90 | 75.19 | 78.58 | 72.00 |
| Pigment/Glitter | 7.30[3] | 4.24[1] | 8.30[2] | 3.40[1] | 16.50[2] |
| Dispersant (Tamol 731) | 0.50 | 0.50 | — | 0.50 | 0.50 |
| Thickeners: | | | | | |
| (Natrosol Plus) | — | — | — | — | — |
| (TT 615) | 1.02 | 1.06 | 1.02 | 1.06 | 0.90 |
| (ASE 60) | 1.02 | 1.06 | 1.02 | 1.06 | 0.90 |
| pH Regulant HCl | — | — | — | — | — |
| KH$_2$PO$_4$/NaOH buffer | — | — | — | — | — |
| Defoamer (Nalco 2305) | 0.13 | 0.13 | 0.13 | 0.13 | 0.20 |
| Surfactant (Triton X405) | 0.25 | 0.25 | — | 0.25 | 0.25 |
| Adhesion Promoter (Silane A-187) | — | — | — | — | — |
| Preservatives: | | | | | |
| (Polyphase AF-1) | 0.13 | 0.13 | 0.13 | 0.13 | 0.15 |
| (Nuosept 95) | — | — | — | — | — |
| (Troysan 174) | 0.18 | 0.19 | 0.18 | 0.19 | 0.20 |
| Freeze/Thaw Protector (Propylene glycol) | 3.71 | 3.83 | 3.70 | 3.86 | 5.00 |
| TOTAL | 100.00 | 100.00 | 100.00 | 100.00 | 100.00 |

(1) Dry Solid. (2) Dispersion. (3) Two pigments: one flake and one fluorescent.

As the paint of the present composition is applied onto a substrate, such as an article of clothing, the more volatile components evaporate, and a film is formed from the acrylic polymer. More specifically, the precise combination of components as defined by the present invention will provide a flexible, fade-resistent film having a high degree of gloss and dimensional stability that will retain these attributes even after repeated laundering. The composition will also provide a dimensionally stable three-dimensional line which will remain this way even after the composition dries. To maximize the performance of these compositions on a fabric or other substrate, the composition should be applied onto the substrate by contacting the end of a dispenser, such as the nipple of a tube, onto the substrate surface. In this way, the composition firmly contacts the substrate, resulting in a maximization of adhesion between the resulting film and the substrate, and therefore the permanence and washability of the film. Advantageously, there should be no air bubbles or other gaps in the composition upon application, which imperfections could result in premature cracking of the film.

What is claimed is:

1. An aqueous acrylic glitter paint composition comprising
   an aqueous emulsion of an acrylic polymer having a glass transition temperature between 0° C. and 20° C.,
   glitter, and
   an associative thickener which does not destabilize the glitter comprising a hydrophobically-modified cellulosic polymer
   wherein after the composition is applied onto a substrate and cured it remains dimensionally stable, flexible and exhibits a gloss of at least 50 after at least one washing.

2. The composition of claim 1, wherein the film-forming acrylic polymer has a glass transition temperature between about 6° C. and about 13° C.

3. The composition according to claim 2, wherein said hydrophobically-modified cellulosic polymer is present in an amount sufficient to achieve a viscosity of about 70,000 to about 85,000 cps.

4. The composition according to claim 3, wherein the concentration of the acrylic polymer ranges from about 30 wt. % to about 40 wt. % of the composition.

5. The composition according to claim 1, wherein said glitter comprises metal flakes having a mean particle size of between about 0.004 square inches and about 0.008 square inches.

6. The composition according to claim 5, wherein the pH of the composition is above 7.0.

7. The composition according to claim 6, wherein the hydrophobically-modified cellulosic polymer is present in an amount sufficient to achieve a viscosity of about 50,000 to about 100,000 cps.

8. The composition according to claim 1, further comprising a colorant selected from the group consisting of pigments, dyes, and mixtures thereof.

9. The composition according to claim 1, further comprising a pH regulant selected from the group consisting of potassium dihydrogen phosphate and sodium hydroxide in an amount such that the pH of the composition ranges from 7 to 8.5, a freeze/thaw protector in an amount ranging from 0 to 10 wt. %, a defoamer in an amount ranging from 0 to 5 wt. %, a glass adhesion promoter in an amount ranging from 0 to 5 wt. %, a preservative in an amount ranging from 0 to 5 wt. %, and a surfactant in an amount ranging from 0 to 5 wt. %, wherein the glitter comprises aluminum coated with a polymeric material.

* * * * *